US012765563B2

(12) United States Patent
Jang et al.

(10) Patent No.: US 12,765,563 B2
(45) Date of Patent: Oct. 20, 2026

(54) IN-LINE DUMPLING MOLDING SYSTEM

(71) Applicant: CJ CHEILJEDANG CORPORATION, Seoul (KR)

(72) Inventors: Bong Jin Jang, Seoul (KR); Se Jin Kim, Seoul (KR); Da Woon Jung, Seoul (KR); Soon Suk Bae, Asan-si (KR); Sang Cheol Kim, Asan-si (KR); Yong Gyu Lee, Cheonan-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 655 days.

(21) Appl. No.: 18/280,013

(22) PCT Filed: Mar. 2, 2022

(86) PCT No.: PCT/KR2022/002942
§ 371 (c)(1),
(2) Date: Sep. 1, 2023

(87) PCT Pub. No.: WO2022/186600
PCT Pub. Date: Sep. 9, 2022

(65) Prior Publication Data

US 2024/0138421 A1 May 2, 2024

(30) Foreign Application Priority Data

Mar. 2, 2021 (KR) ........................ 10-2021-0027477

(51) Int. Cl.
*A21C 9/06* (2006.01)
*A21C 11/00* (2006.01)
(Continued)

(52) U.S. Cl.
CPC ............ *A21C 9/063* (2013.01); *A21C 11/004* (2013.01); *A21C 11/10* (2013.01); *A23P 20/20* (2016.08)

(58) Field of Classification Search
CPC .......... A23P 20/20; A23P 30/10; A21C 9/063; A21C 11/02; A21C 11/004; A21C 11/10; A21C 9/066
See application file for complete search history.

(56) References Cited

U.S. PATENT DOCUMENTS 4,388,059 A * 6/1983 Ma ......................... A21C 9/063 425/117
2017/0006911 A1 1/2017 Lutchmansingh
(Continued)

FOREIGN PATENT DOCUMENTS

CN 106998701 A 8/2017
CN 108497008 A * 10/2017 ............ A21C 9/068
(Continued)

OTHER PUBLICATIONS

English machine translation of KR 20160099796 (Year: 2026).*
(Continued)

*Primary Examiner* — Topaz L. Elliott
(74) *Attorney, Agent, or Firm* — Morgan, Lewis & Bockius LLP

(57) ABSTRACT

An in-line dumpling molding system is disclosed. The in-line dumpling molding system according to the present invention comprises: a dumpling wrapper cutting device, which cuts a supplied dough sheet to form dumpling wrappers; a dumpling-molding lower folding device, which is disposed below the dumpling wrapper cutting device, on which the cut dumpling wrappers are loaded, and which presses and folds the dumpling wrappers onto which dumpling fillings have been supplied; and a sealing device, which is disposed above the dumpling-molding lower folding device, and presses and seals the folded dumpling wrappers.

12 Claims, 14 Drawing Sheets

(51) Int. Cl.
*A21C 11/10* (2006.01)
*A23P 20/20* (2016.01)

(56) References Cited

U.S. PATENT DOCUMENTS

| | | | |
|---|---|---|---|
| 2019/0174771 A1 | 6/2019 | Gong et al. | |
| 2020/0068905 A1 | 3/2020 | Gong et al. | |

FOREIGN PATENT DOCUMENTS

| | | | | | |
|---|---|---|---|---|---|
| CN | 106305880 B | | 10/2020 | | |
| CN | 112155027 A | * | 1/2021 | ............. | A21C 9/066 |
| CN | 212520602 U | | 2/2021 | | |
| IN | 105360196 B | | 8/2018 | | |
| JP | S55-61765 A | | 5/1980 | | |
| JP | H08-107752 A | | 4/1996 | | |
| JP | 2002-085043 A | | 3/2002 | | |
| JP | 2002125576 A | * | 5/2002 | | |
| JP | 2002-233349 A | | 8/2002 | | |
| JP | 3189262 U | | 3/2014 | | |
| JP | 2020-080667 A | | 6/2020 | | |
| KR | 20-0357902 Y1 | | 7/2004 | | |
| KR | 10-2016-0069873 A | | 6/2016 | | |
| KR | 10-2016-0099796 A | | 8/2016 | | |
| KR | 101787654 B1 | * | 10/2017 | ............. | A23P 20/25 |
| KR | 10-2018-0105009 A | | 9/2018 | | |
| KR | 10-2018-0114661 A | | 10/2018 | | |
| KR | 10-2019-0024489 A | | 3/2019 | | |
| KR | 10-2073611 B1 | | 2/2020 | | |
| KR | 10-2020-0125435 A | | 11/2020 | | |
| RU | 2134969 C1 | | 8/1999 | | |
| RU | 2450520 C1 | | 5/2012 | | |

OTHER PUBLICATIONS

International Search Report issued in corresponding International Patent Application No. PCT/KR2022/002942 dated Jun. 9, 2022.

Office Action issued in corresponding Chinese Patent Application No. 202280018895.4, dated Aug. 1, 2025.

Office Action issued Mar. 5, 2024 for Russian Patent Application No. 2023125016 (See English Translation).

Office Action issued Feb. 17, 2023 for counterpart Korean Patent Application No. 10-2021-0027477 (See English translation).

Office Action for corresponding Japanese Application No. 2023-553120 dated Aug. 6, 2024.

* cited by examiner

IN-LINE DUMPLING MOLDING SYSTEM

TECHNICAL FIELD

The present disclosure relates to an in-line dumpling forming system, and more particularly, to an in-line dumpling forming system that receives a noodle sheet for a dumpling skin, cuts the dumpling skin, folds the dumpling skin filled with dumpling filling, and thus forms a dumpling.

BACKGROUND ART

In general, dumplings are made by filling insides of dumpling skins made from wheat flour dough with dumpling filling. In this case, due to difficulty of work of joining the dumpling skins filled with the dumpling filling, in the related art, a person should make the dumplings one by one by hand.

Thus, a lot of time and labor are taken for making the dumplings, and mass production thereof is difficult.

In recent years, to solve this problem, some dumpling forming apparatuses that automatically produce the dumplings have been manufactured. However, a structure thereof is complex, an installation area is large, and thus production capacity is low compared as the installation area.

Further, in a dumpling forming apparatus according to the related art, poor sealing occurs in which, in a process of folding and sealing the dumpling skin filled with the dumpling filling, the dumpling skin is not correctly sealed, and thus the dumpling filling escapes from the dumpling skin.

DISCLOSURE

Technical Problem

Embodiments of the present disclosure provide an in-line dumpling forming system in which an installation area thereof is small, and thus productivity is high as compared to the installation area, and a dumpling may be formed into an accurate shape, and thus the occurrence of defects may be reduced.

Technical Solution

According to an aspect of the present disclosure, there is provided an in-line dumpling forming system including a dumpling skin cutting device that cuts a noodle sheet to form a dumpling skin, a dumpling forming lower folding device which is disposed in a lower area of the dumpling skin cutting device, on which the cut dumpling skin is seated, and which presses and folds the dumpling skin to which dumpling filling is supplied, and a sealing device that is disposed on an upper area of the dumpling forming lower folding device and presses and seals the folded dumpling skin.

The dumpling skin cutting device may include a cutting device frame, a first noodle sheet presser that is supported by the cutting device frame and primarily presses the noodle sheet with a protrusion cutter formed in the dumpling forming lower folding device, and a second noodle sheet presser that is supported by the cutting device frame, is spaced apart from the first noodle sheet presser, and secondarily presses, with the protrusion cutter, the noodle sheet primarily pressed by the first noodle sheet presser.

The first noodle sheet presser may include a first rotational bar part rotatably coupled to the cutting device frame, a first pressing roller part that is rotatably coupled to the first rotational bar part and presses the noodle sheet, and a first height adjusting part that is supported by the cutting device frame, is connected to the first rotational bar part, and adjusts a height of the first pressing roller part with respect to the protrusion cutter by adjusting a rotational angle of the first rotational bar part.

The second noodle sheet presser may include a second rotational bar part rotatably coupled to the cutting device frame, a second pressing roller part that is rotatably coupled to the second rotational bar part and presses the noodle sheet, and a second height adjusting part that is supported by the cutting device frame, is connected to the second rotational bar part, and adjusts a height of the second pressing roller part with respect to the protrusion cutter by adjusting a rotational angle of the second rotational bar part.

The sealing device may include a sealing pressing unit including a first sealing pad that presses the dumpling skin folded by the dumpling forming lower folding device and a second sealing pad that is spaced apart from the first sealing pad and presses the dumpling skin in a direction of the first sealing pad, a sealing cam rail unit that is connected to the sealing pressing unit and moves the first sealing pad and the second sealing pad, and a sealing moving unit that is connected to the sealing pressing unit and moves the sealing pressing unit relative to the sealing cam rail unit.

A plurality of sealing pressing units may be provided, and the plurality of sealing pressing units may be arranged in a caterpillar form.

The sealing pressing unit may include a sealing support plate part connected to the sealing moving unit, a first moving plate part which is coupled to the sealing support plate part to be relatively movable and to which the first sealing pad is coupled, a first moving plate moving part coupled to the first moving plate part, connected to the sealing cam rail unit, and moves the first moving plate part, a second moving plate part which is coupled to the sealing support plate part to be relatively movable and to which the second sealing pad is coupled, a second moving plate moving part coupled to the second moving plate part, connected to the sealing cam rail unit, and moves the second moving plate part, a first original position returning part that is coupled to the sealing support plate part, is connected to the first moving plate part, and returns the first moving plate part moved by the first moving plate moving part to an original position thereof, and a second original position returning part that is coupled to the sealing support plate part, is connected to the second moving plate part, and returns the second moving plate part moved by the second moving plate moving part to an original position thereof.

The first moving plate moving part may include a first rotation center shaft coupled to the first moving plate part, and a first rotating roller rotatably coupled to the first rotation center shaft.

The second moving plate moving part may include a second rotation center shaft coupled to the second moving plate part, and a second rotating roller rotatably coupled to the second rotation center shaft.

The first original position returning part may include a first returning fixing block coupled to the sealing support plate part, a first moving plate protrusion block coupled to the first moving plate part and passing through a first through-hole formed in the sealing support plate part, and a first returning elastic body that is coupled to the first returning fixing block, is connected to the first moving plate protrusion block, and presses the first moving plate protrusion block.

The second original position returning part may include a second returning fixing block coupled to the sealing support plate part, a second moving plate protrusion block coupled to the second moving plate part and passing through a second through-hole formed in the sealing support plate part, and a second returning elastic body coupled to the second returning fixing block, connected to the second moving plate protrusion block, and configured to press the second moving plate protrusion block.

The sealing cam rail unit may include a first sealing support rail part in which the first rotating roller moves along a side surface thereof, and a second sealing support rail part in which the second rotating roller moves along a side surface thereof.

Advantageous Effects

An in-line dumpling forming system according to embodiments of the present disclosure may include a dumpling skin cutting device that forms a dumpling skin by cutting a noodle sheet, a dumpling forming lower folding device that is disposed in a lower area of the dumpling skin cutting device and presses and folds the dumpling skin to which dumpling filling is supplied, and the sealing device that is disposed in an upper area of the dumpling forming lower folding device and presses and seals the folded dumpling skin. Thus, an installation area may be reduced by positioning the dumpling skin cutting device and the sealing device on the upper area of the dumpling forming lower folding device. Accordingly, productivity is high compared to the installation area, and the dumpling may be formed into an accurate shape, and thus occurrence of defects may be reduced.

MODE FOR INVENTION

To fully understand the present disclosure, operational advantages of the present disclosure, and purposes achieved by implementing the present disclosure, the accompanying drawings illustrating embodiments of the present disclosure and contents described in the accompanying drawings should be referenced.

Hereinafter, embodiments of the present disclosure will be described with reference to the accompanying drawings, and thus the present disclosure will be described in detail. However, in describing the present disclosure, descriptions of already widely known functions and configurations will be omitted to make the subject matter of the present disclosure clear.

Figure 1:
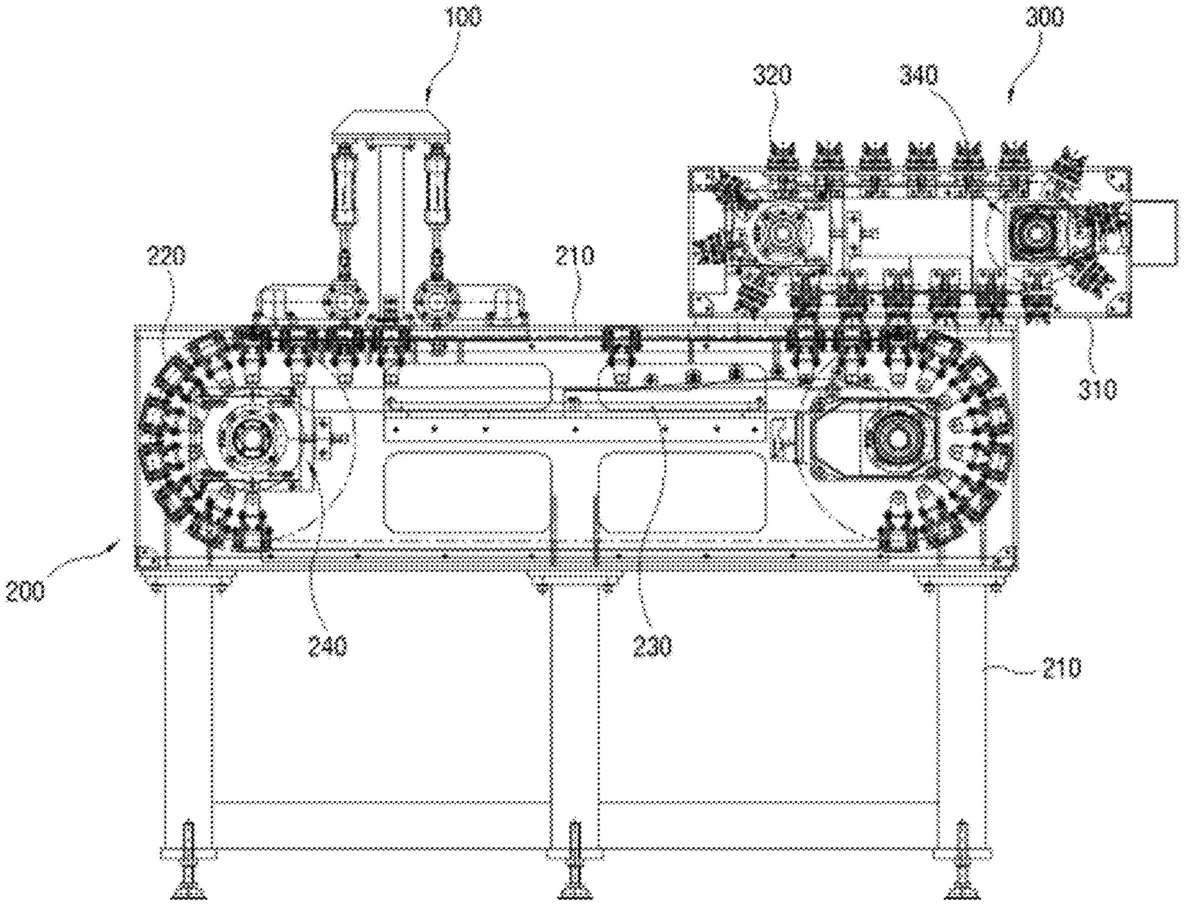
FIG. 1 is a view illustrating an in-line dumpling forming system according to an embodiment of the present disclosure.
Figure 2:
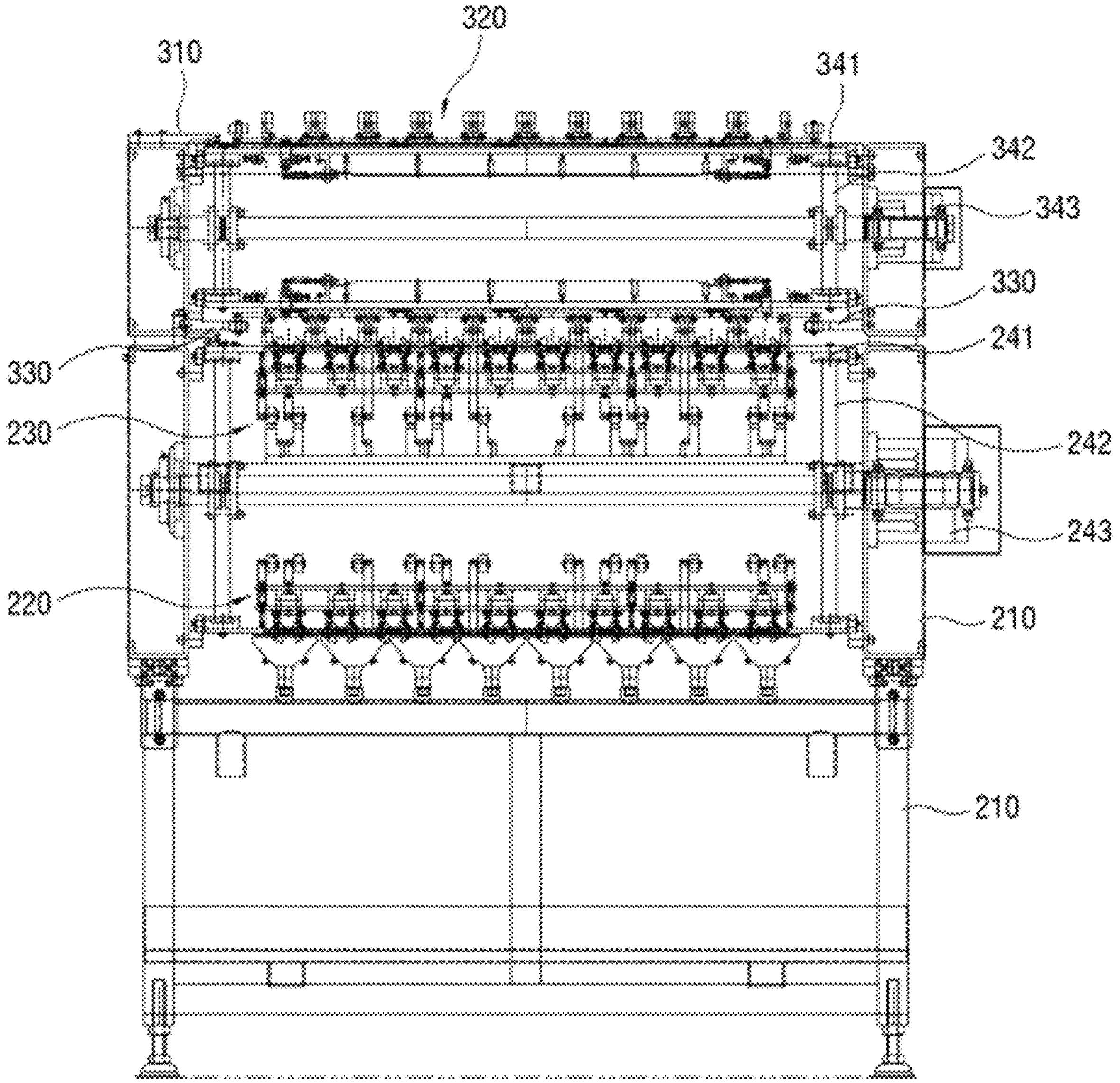
FIG. 2 is a view illustrating a right surface of FIG. 1.
Figure 3:
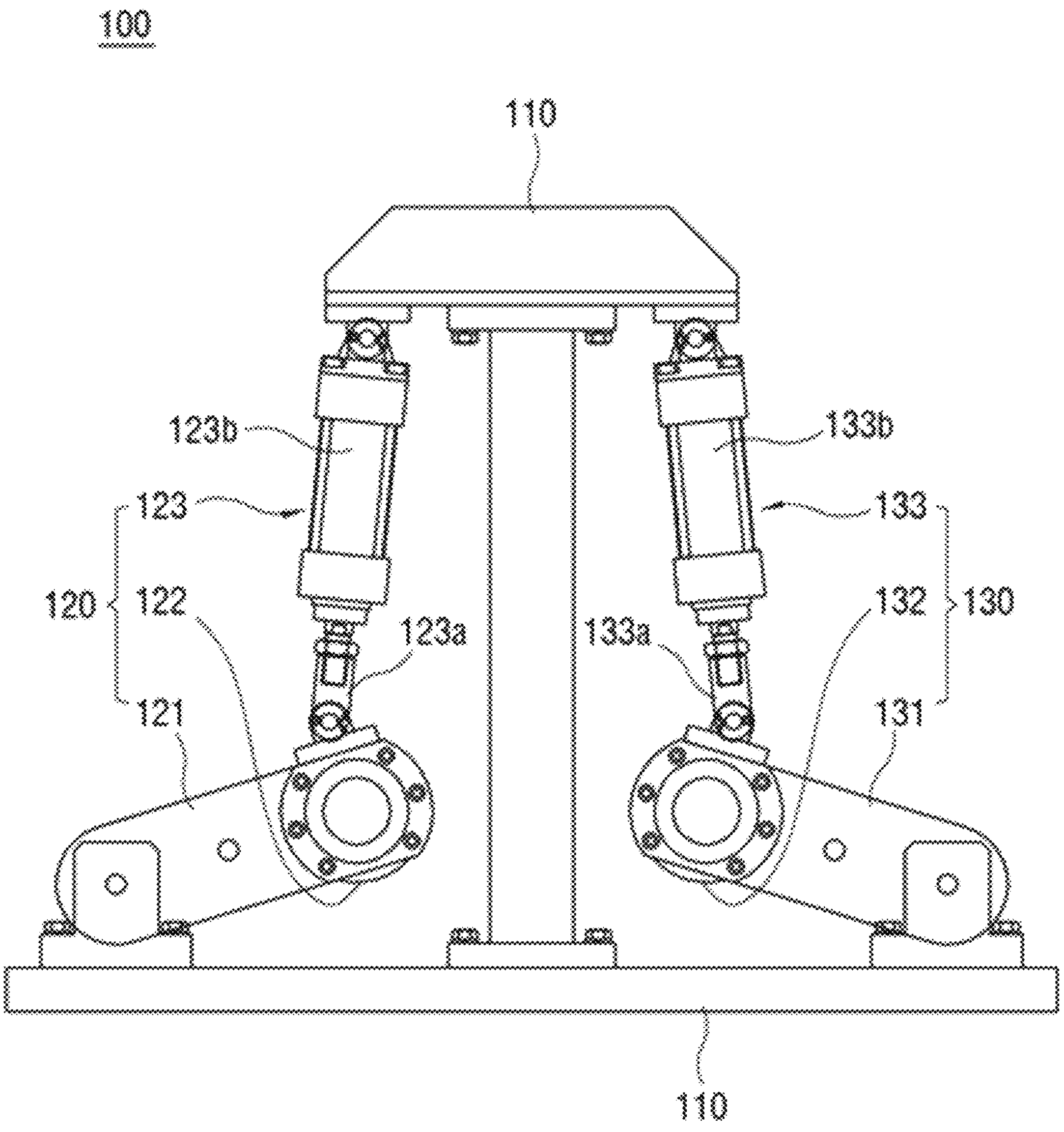
FIG. 3 is a view illustrating a dumpling skin cutting device of FIG. 1.
Figure 4:
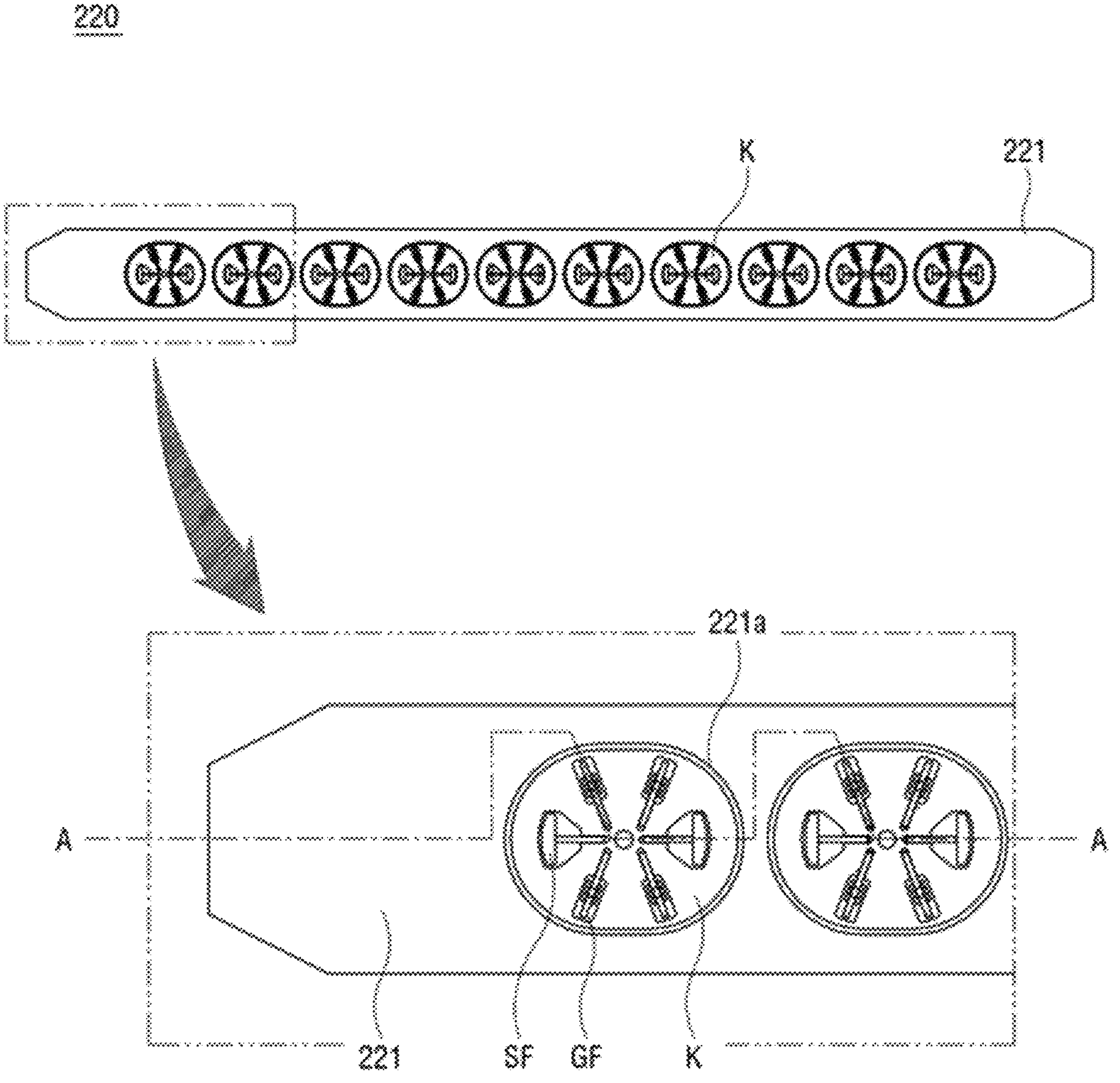
FIG. 4 is a plan view illustrating a dumpling skin pressing unit of FIG. 1.
Figure 5:
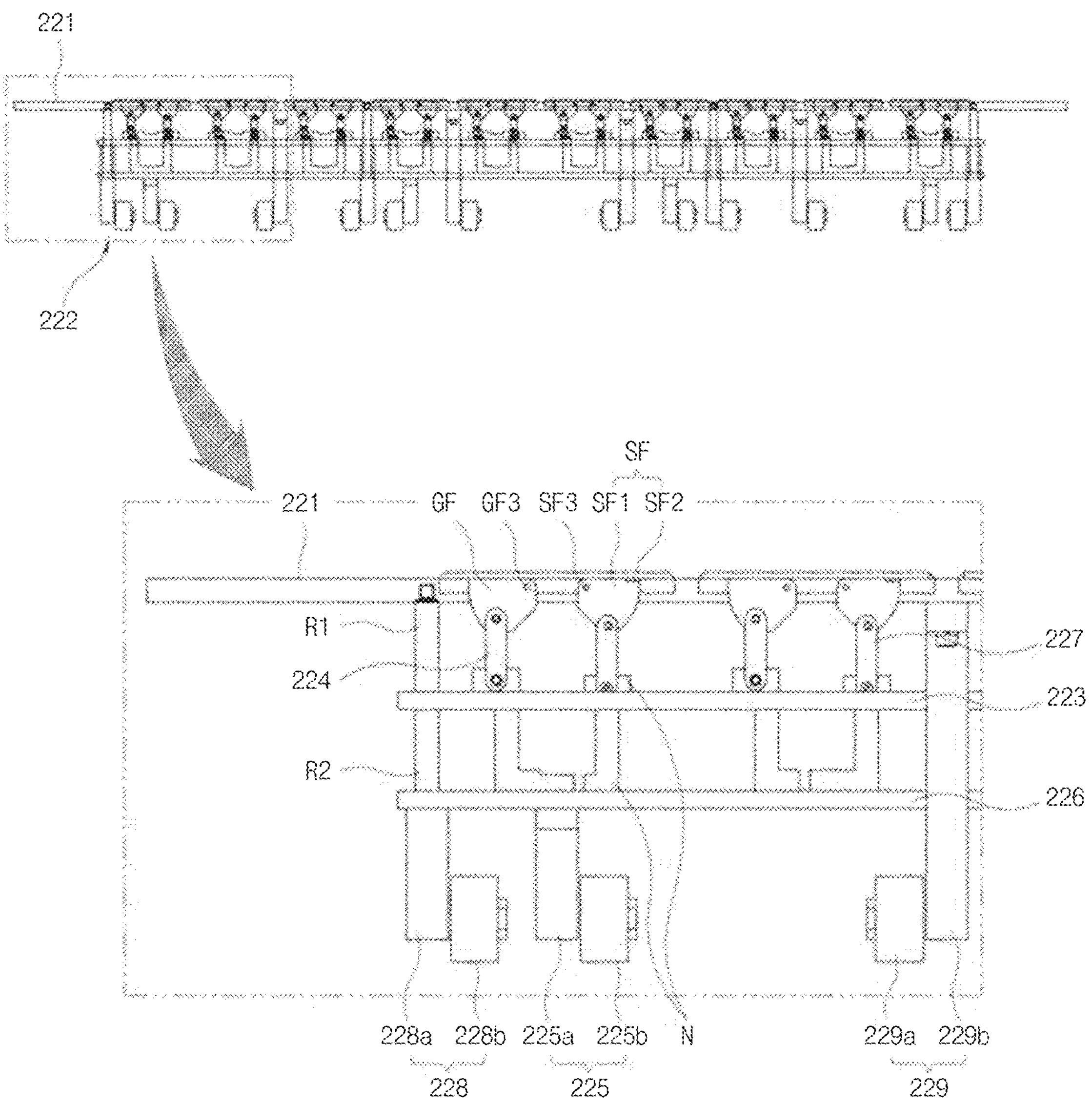
FIGS. 5 and 6 are views illustrating a foldable rotation driving module of the dumpling skin pressing unit.
Figure 6:
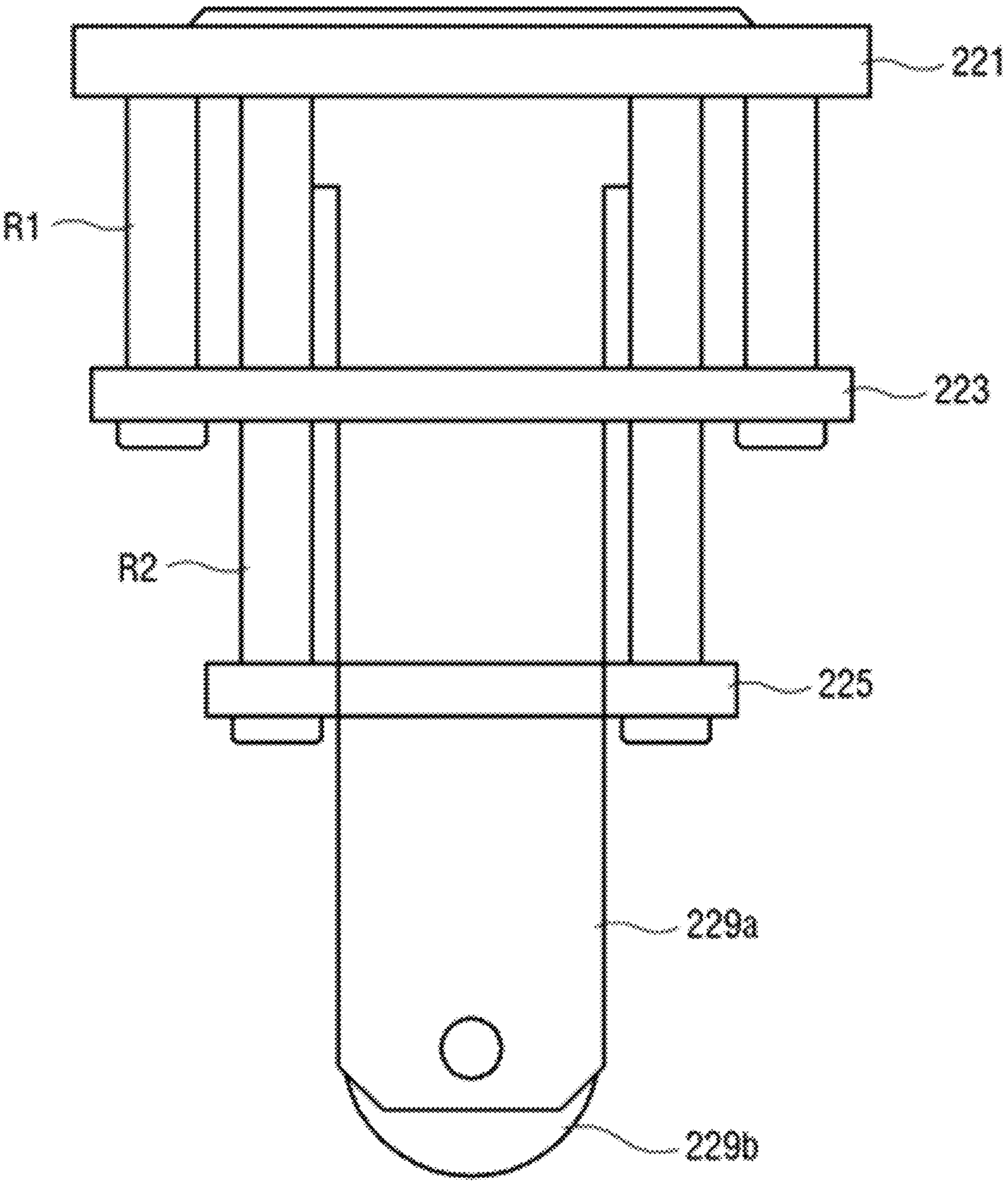
Figure 7:
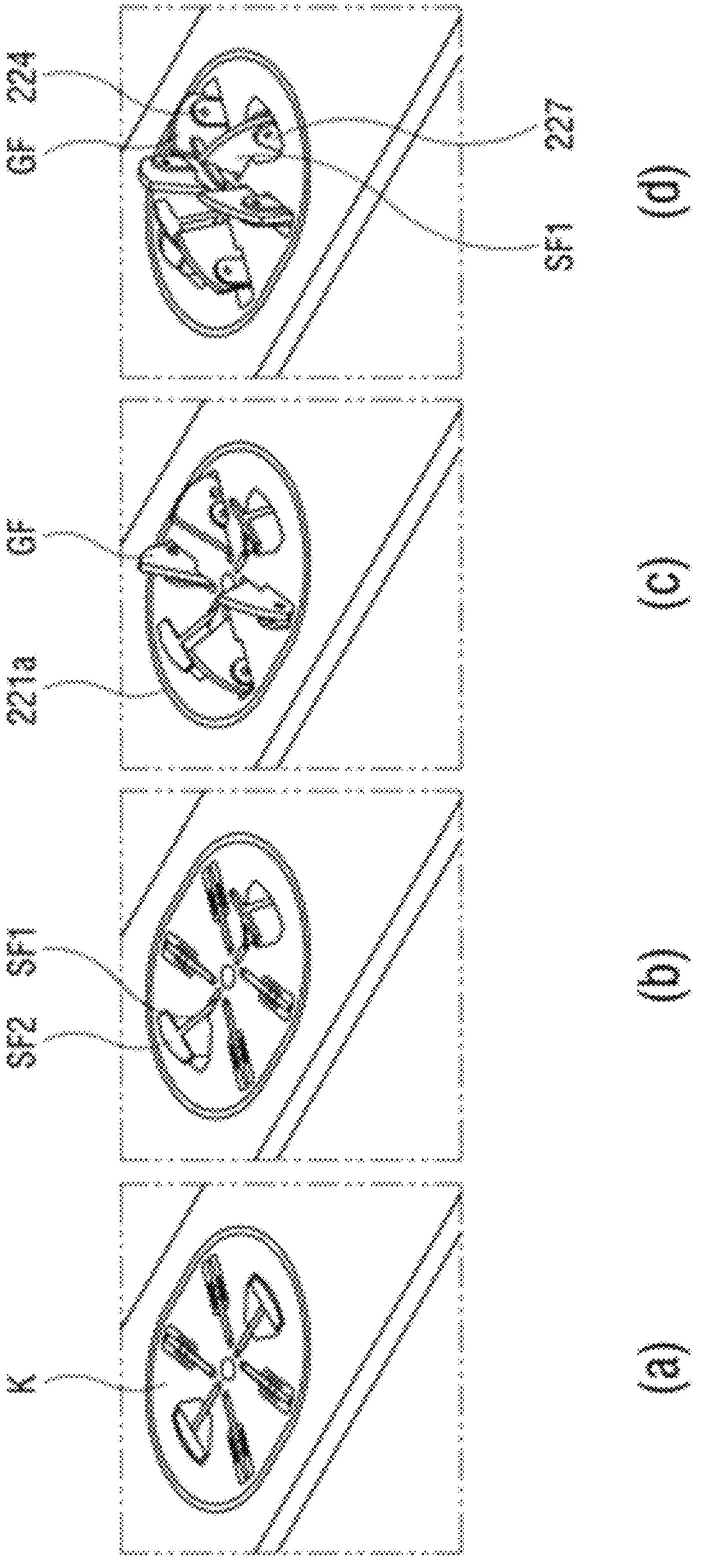
FIG. 7 is a cross sectional view along line A-A of FIG. 4.
Figure 8:
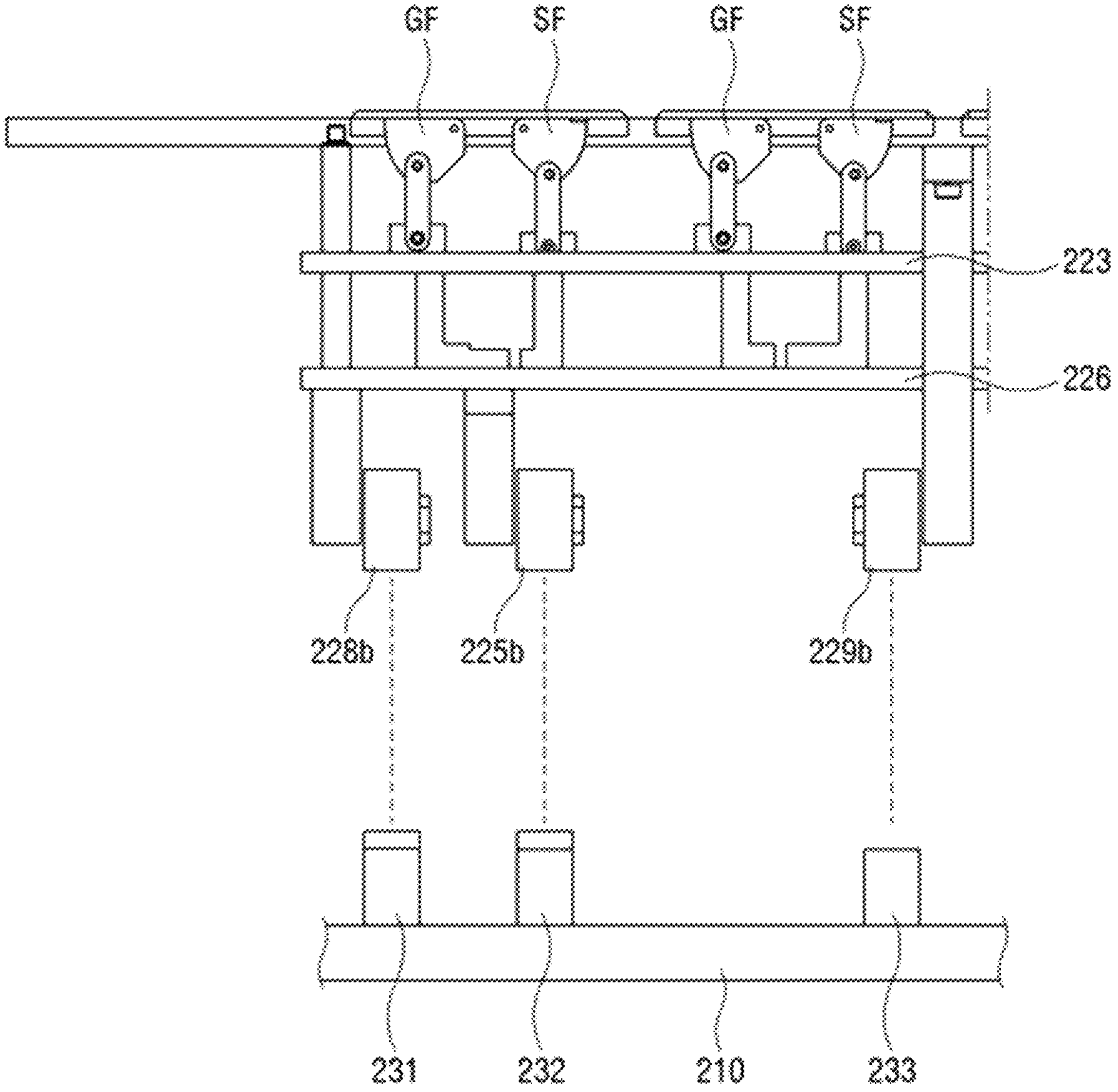
FIGS. 8 and 9 are views illustrating a foldable cam rail unit of FIG. 1.
Figure 9:
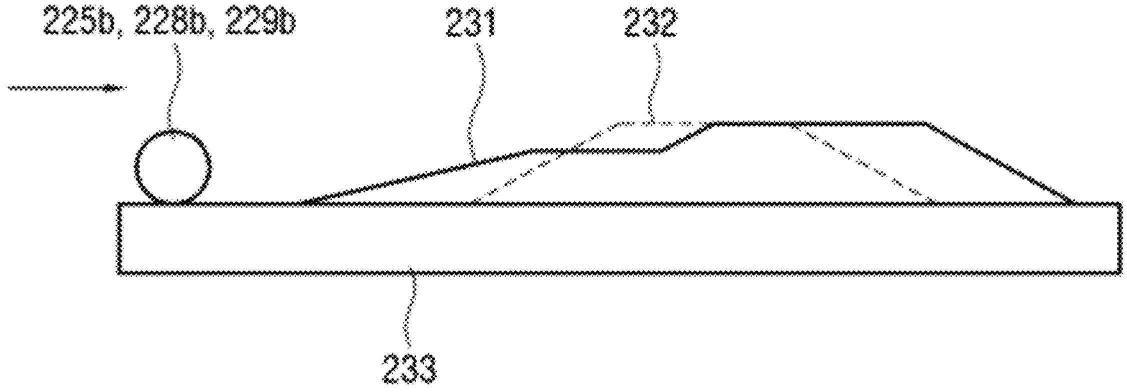
Figure 10:
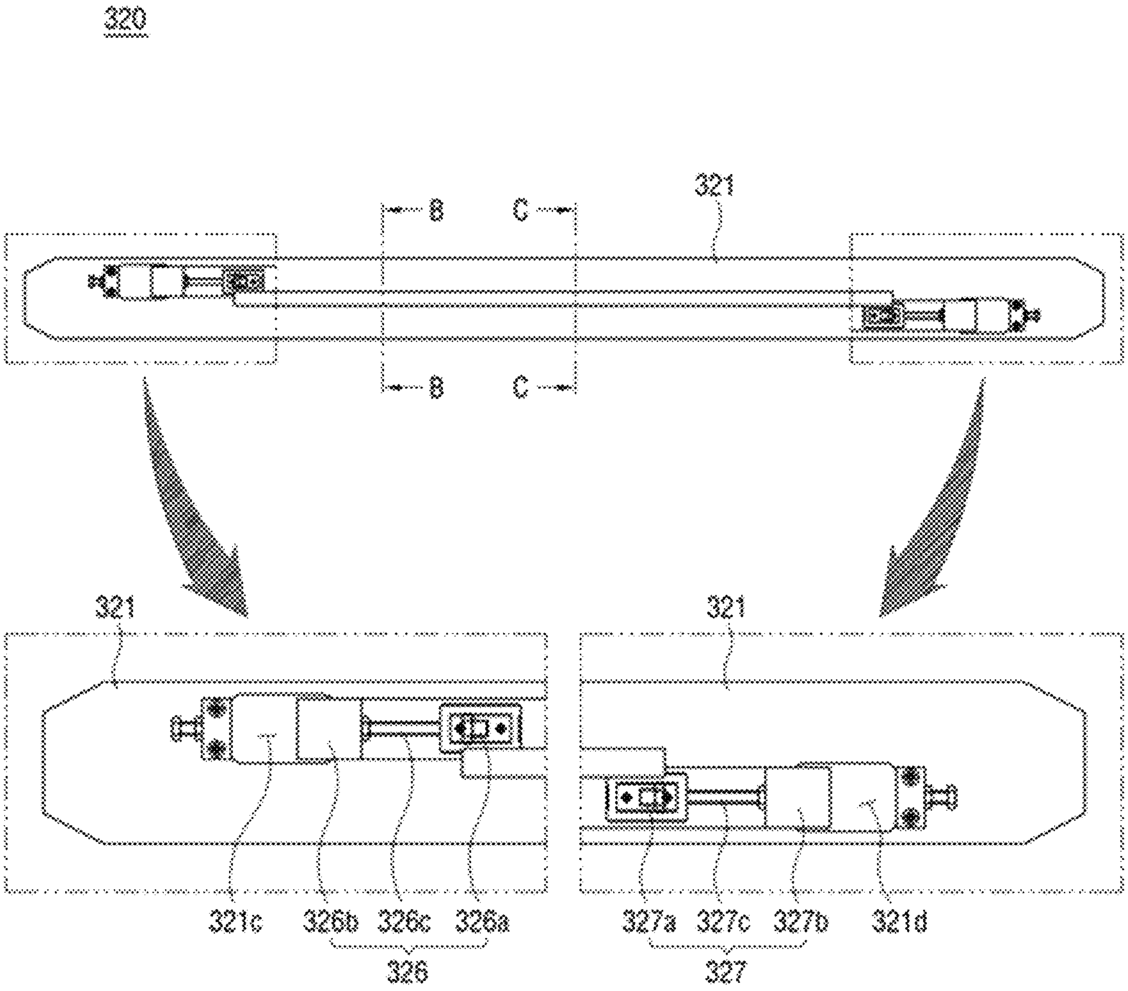
FIG. 10 is a plan view illustrating a sealing pressurization unit of FIG. 1.
Figure 11:
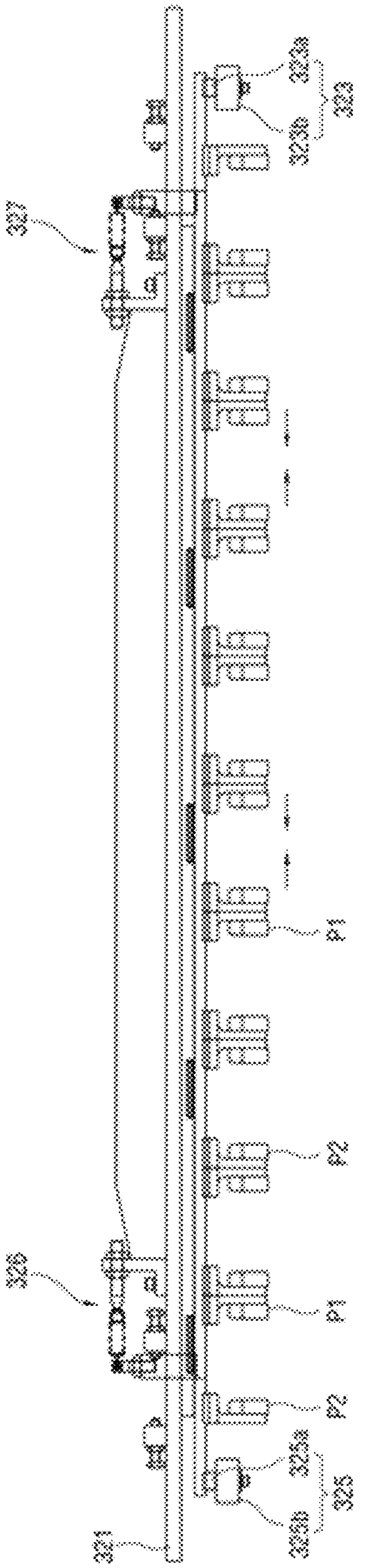
FIG. 11 is a front view of FIG. 10.
Figure 12:
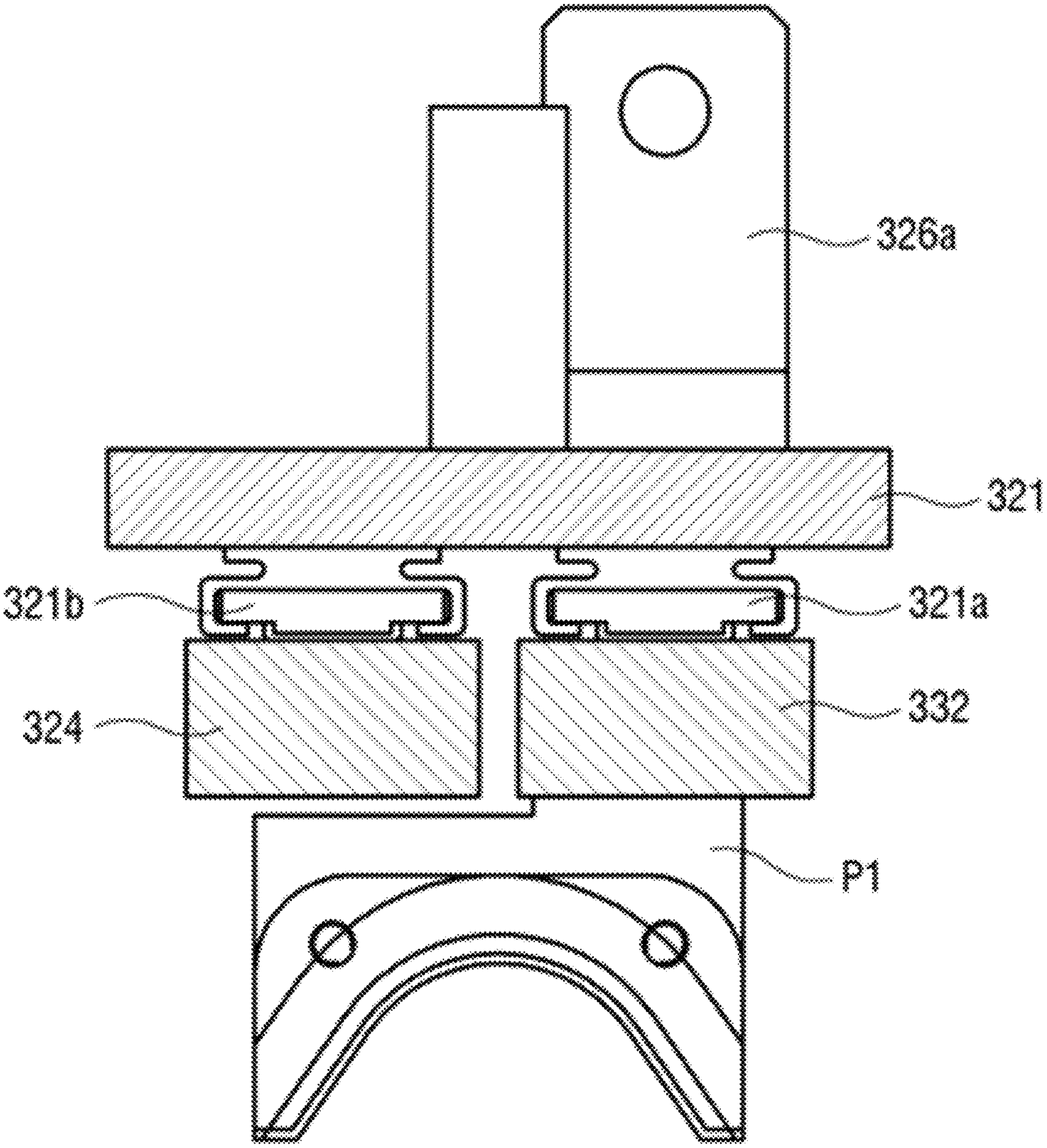
FIG. 12 is a cross sectional view along line B-B of FIG. 10.
Figure 13:
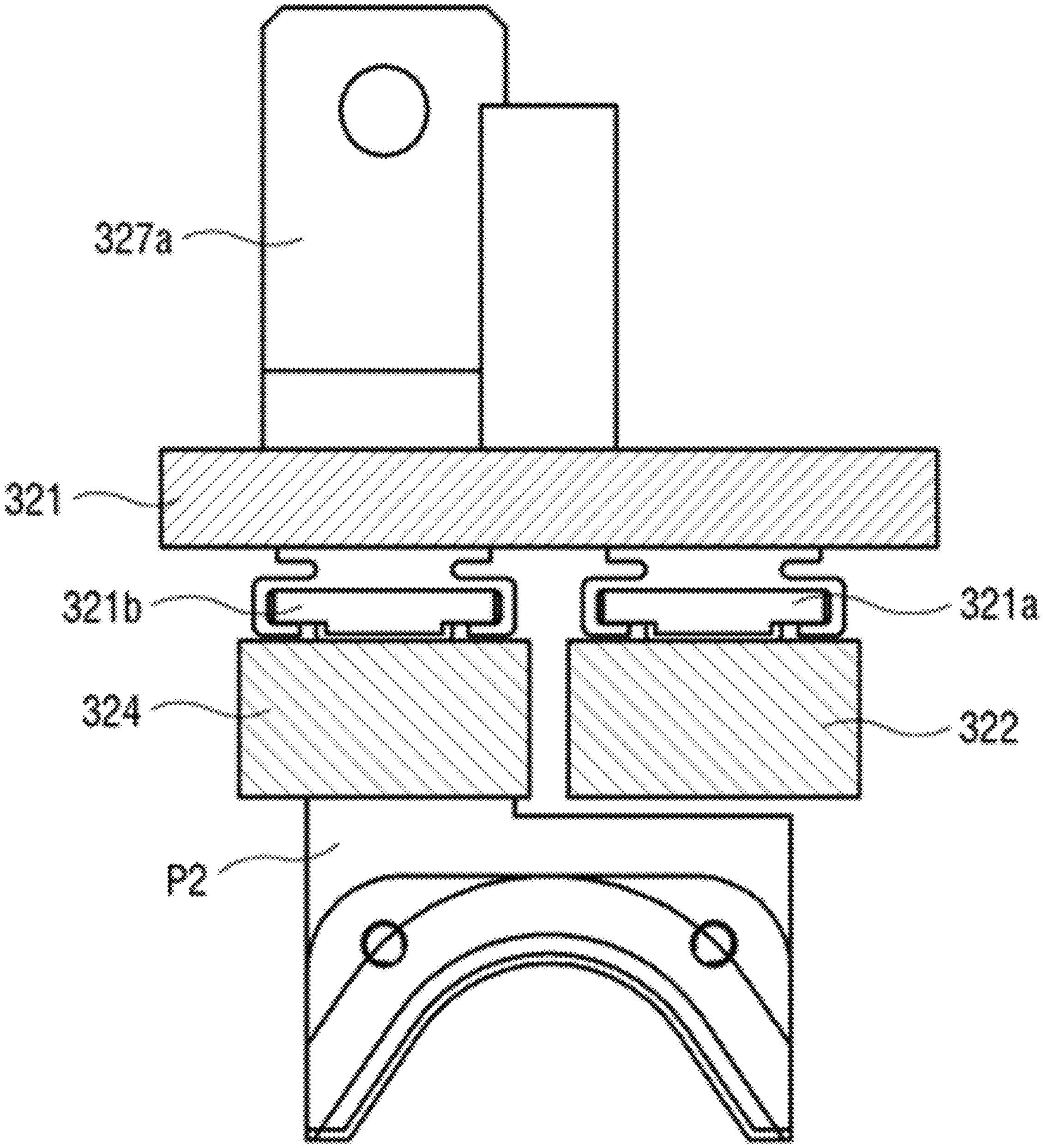
FIG. 13 is a cross sectional view along line C-C of FIG. 10.
Figure 14:
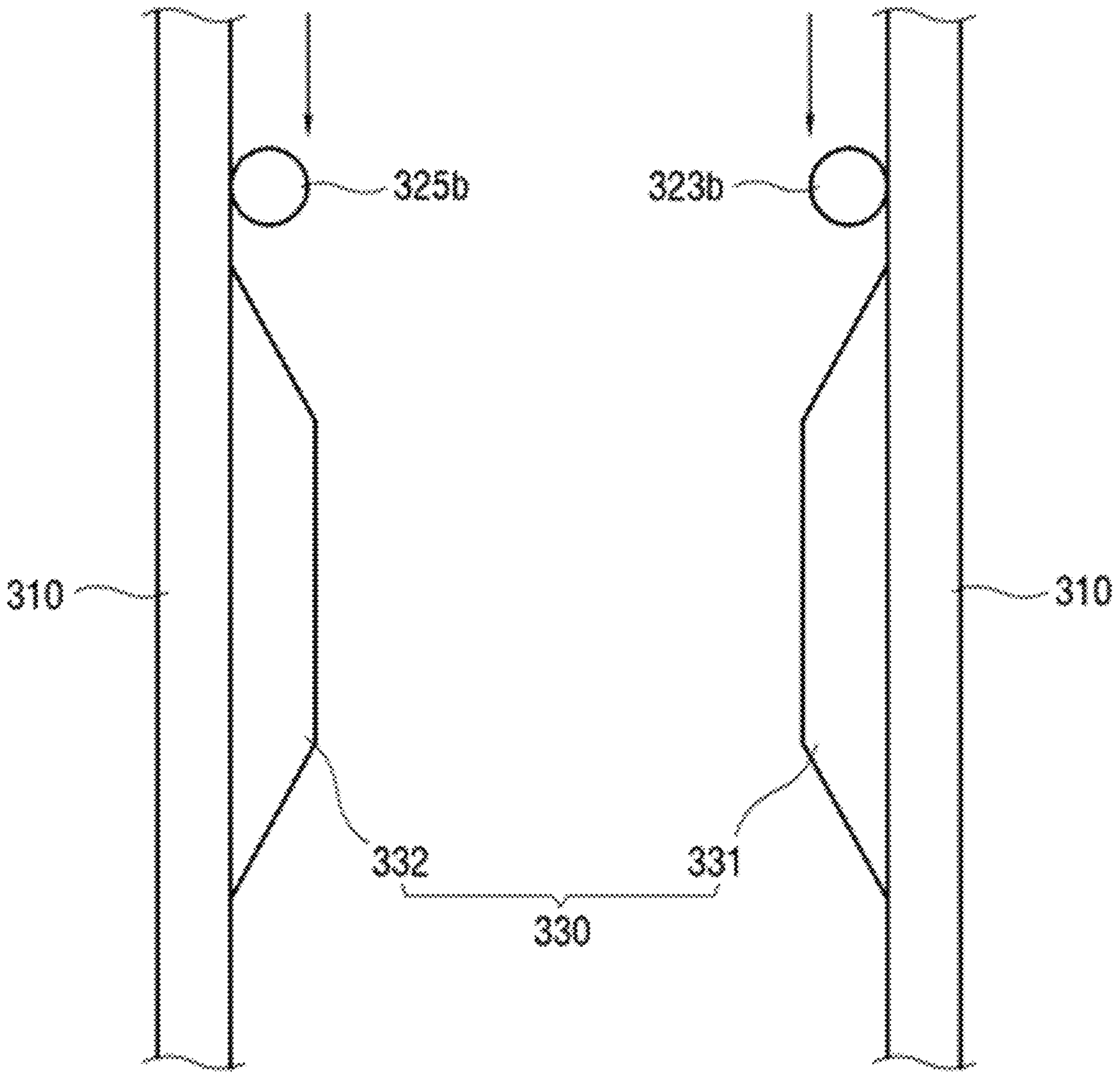
FIG. 14 is a plan view illustrating a sealing cam rail unit of FIG. 1.

FIG. 1 is a view illustrating an in-line dumpling forming system according to an embodiment of the present disclosure, FIG. 2 is a view illustrating a right surface of FIG. 1, FIG. 3 is a view illustrating a dumpling skin cutting device of FIG. 1, FIG. 4 is a plan view illustrating a dumpling skin pressing unit of FIG. 1, FIGS. 5 and 6 are views illustrating a foldable rotation driving module of the dumpling skin pressing unit, FIG. 7 is a cross sectional view along line A-A of FIG. 4, FIGS. 8 and 9 are views illustrating a foldable cam rail unit of FIG. 1, FIG. 10 is a plan view illustrating a sealing pressurization unit of FIG. 1, FIG. 11 is a front view of FIG. 10, FIG. 12 is a cross sectional view along line B-B of FIG. 10, FIG. 13 is a cross sectional view along line C-C of FIG. 10, and FIG. 14 is a plan view illustrating a sealing cam rail unit of FIG. 1.

As illustrated in FIGS. 1 to 14, the in-line dumpling forming system according to the present embodiment may include a noodle sheet supply device (not illustrated) that supplies a noodle sheet for a dumpling skin, a dumpling skin cutting device 100, a dumpling filling supply device (not illustrated) that supplies dumpling filling to a cut dumpling skin, a dumpling forming lower folding device 200, and a sealing device 300.

The noodle sheet supply device (not illustrated) may be disposed adjacent to the dumpling skin cutting device 100 and supply the noodle sheet for the dumpling skin to the dumpling skin cutting device 100.

The dumpling skin cutting device 100 may form the dumpling skin (not illustrated) by cutting the supplied noodle sheet for the dumpling skin (not illustrated). As illustrated in FIGS. 1 to 3, the dumpling skin cutting device 100 may include a cutting device frame 110 supported by the dumpling forming lower folding device 200, a first noodle sheet presser 120 that is supported by the cutting device frame 110 and primarily presses the noodle sheet for the dumpling skin with a protrusion cutter 221*a* formed in the dumpling forming lower folding device 200, and a second noodle sheet presser 130 that is supported by the cutting device frame 110, is spaced apart from the first noodle sheet presser 120, and secondarily presses, with the protrusion cutter 221*a*, the noodle sheet for the dumpling skin primarily pressed by the first noodle sheet presser 120.

The cutting device frame 110 may be coupled to and supported by a folding device frame 210, which will be described below, of the dumpling forming lower folding device 200.

The first noodle sheet presser 120 may be supported by the cutting device frame 110. The first noodle sheet presser 120 may primarily press the noodle sheet for the dumpling skin toward the protrusion cutter 221*a* formed in the dumpling forming lower folding device 200, which will be described below.

As illustrated in FIGS. 1 and 3, the first noodle sheet presser 120 according to the present embodiment may include a first rotational bar part 121 rotatably coupled to the cutting device frame 110, a first pressing roller part 122 that is rotatably coupled to the first rotational bar part 121 and presses the noodle sheet for the dumpling skin, and a first height adjusting part 123 that is supported by the cutting device frame 110, is connected to the first rotational bar part 121, and adjusts a height of the first pressing roller part 122 with respect to the protrusion cutter 221*a* by adjusting a rotational angle of the first rotational bar part 121.

The first rotational bar part 121 may be rotatably coupled to the cutting device frame 110. The first rotational bar part 121 may be formed in a long bar shape.

The first pressing roller part 122 may be rotatably coupled to the first rotational bar part 121. The first pressing roller part 122 may slightly press the noodle sheet for the dumpling skin against the protrusion cutter 221*a* and thus align the dumpling skin (the noodle sheet for the dumpling skin) before final cutting by the second noodle sheet presser 130.

The first height adjusting part 123 may be supported by the cutting device frame 110. The first height adjusting part 123 may be connected to the first rotational bar part 121 and adjust the height of the first pressing roller part 122 with respect to the protrusion cutter 221*a* by adjusting a rotation angle of the first rotational bar part 121.

A pressing force of the first pressing roller part 122 may be adjusted by adjusting the height of the first pressing roller part 122 by the first height adjusting part 123.

The first height adjusting part 123 according to the present embodiment may include a first height adjusting cylinder rod 123*a* rotatably coupled to the first rotational bar part 121 and a first height adjusting pressure cylinder body 123*b* that is rotatably coupled to the cutting device frame 110 so that the first height adjusting cylinder rod 123*a* may relatively move, and moves the first height adjusting cylinder rod 123*a*.

The second noodle sheet presser 130 may be supported by the cutting device frame 110 and spaced apart from the first noodle sheet presser 120. The second noodle sheet presser 130 may form the dumpling skin by secondarily pressing, with the protrusion cutter 221*a*, the noodle sheet for the dumpling skin, which is primarily pressed by the first noodle sheet presser 120.

As illustrated in FIG. 3, the second noodle sheet presser 130 according to the present embodiment may include a second rotational bar part 131 rotatably coupled to the cutting device frame 110, a second pressing roller part 132 that is rotatably coupled to the second rotational bar part 131 and presses the noodle sheet for the dumpling skin, and a second height adjusting part 133 that is supported by the cutting device frame 110, is connected to the second rotational bar part 131, and adjusts a height of the second pressing roller part 132 with respect to the protrusion cutter 221*a* by adjusting a rotational angle of the second rotational bar part 131.

The second rotational bar part 131 may be rotatably coupled to the cutting device frame 110. The second rotational bar part 131 may be formed in a long bar shape.

The second pressing roller part 132 may be rotatably coupled to the second rotational bar part 131. The second pressing roller part 132 may finally press the noodle sheet for the dumpling skin slightly pressed by the first pressing roller part 122 toward the protrusion cutter 221*a* and thus cut the dumpling skin from the noodle sheet for the dumpling skin.

The second height adjusting part 133 may be supported by the cutting device frame 110. The second height adjusting part 133 may be connected to the second rotational bar part 131 and adjust the height of the second pressing roller part 132 with respect to the protrusion cutter 221*a* by adjusting a rotation angle of the second rotational bar part 131. A pressing force of the second pressing roller part 132 may be adjusted by adjusting the height of the second pressing roller part 132 by the second height adjusting part 133.

The second height adjusting part 133 according to the present embodiment may include a second height adjusting cylinder rod 133*a* rotatably coupled to the second rotational bar part 131 and a second height adjusting pressure cylinder body 133*b* that is rotatably coupled to the cutting device frame 110 so that the second height adjusting cylinder rod 133*a* may relatively move, and moves the second height adjusting cylinder rod 133*a*.

The dumpling filling supply device (not illustrated) may supply the dumpling filling to the dumpling skin cut by the dumpling skin cutting device 100. The dumpling filling supply device (not illustrated) may be disposed in an upper area of the dumpling forming lower folding device 200 and supply the dumpling filling to an upper surface of the dumpling skin supported by the dumpling forming lower folding device 200 disposed in a lower area. The dumpling filling supply device (not illustrated) according to the present embodiment may be disposed between the dumpling skin cutting device 100 and the sealing device 300.

The dumpling forming lower folding device 200 may be disposed in a lower area of the dumpling skin cutting device 100. The dumpling forming lower folding device 200 may press and fold the dumpling skin, to which the dumpling filling is supplied, from a lower side.

The dumpling forming lower folding device 200 according to the present embodiment may include the folding device frame 210 supported on the ground, a dumpling skin pressing unit 220 having a plurality of dumpling skin folding parts SF and GF that sequentially press the dumpling skin to sequentially fold the dumpling skin, a folding cam rail unit 230 that is disposed adjacent to the dumpling skin pressing unit 220, is connected to the dumpling skin pressing unit 220, and moves the dumpling skin folding parts SF and GF, and a folding moving unit 240 that is connected to the dumpling skin pressing unit 220 and moves the dumpling skin pressing unit 220 relative to the folding cam rail unit 230.

As illustrated in FIG. 1, a plurality of dumpling skin pressing units 220 may be provided and arranged in a caterpillar form. The plurality of dumpling skin pressing units 220 may be coupled to a folding chain part 241, which will be described below, of the folding moving unit 240, may be rotated and transferred according to rotation of the folding chain part 241, and may move the dumpling skin in a direction from the dumpling skin cutting device 100 to the sealing device 300.

As illustrated in FIGS. 1 to 9, the dumpling skin pressing unit 220 may include an upper plate part 221 connected to the folding moving unit 240 and rotatably coupled to the dumpling skin folding parts SF and GF, a folding rotation driving module 222 that is connected to the upper plate part 221 and rotates the dumpling skin folding parts SF and GF, and an upper plate support part 229 connected to the folding cam rail unit 230 and supporting the upper plate part 221.

A dumpling skin seated area "K" on which the dumpling skin cut by the dumpling skin pressing unit 220 is seated may be formed in the upper plate part 221. As illustrated in FIG. 4, a plurality of dumpling skin seated areas "K" may be provided and may be spaced apart from each other in a lengthwise direction of the upper plate part 221. When the dumpling skin folding parts SF and GF are driven, one area of the dumpling skin may be spaced apart from the upper plate part 221.

The upper plate part 221 of the present embodiment may be provided with the protrusion cutter 221*a* defining a circumference of the dumpling skin seated area "K". The protrusion cutter 221*a* may protrude from an upper surface of the upper plate part 221 and may be formed in a circular or elliptical shape. The protrusion cutter 221*a* of the present embodiment may come into contact a lower surface of the noodle sheet for the dumpling skin pressed by the dumpling skin pressing unit 220 so as to cut the dumpling skin in a shape of the protrusion cutter 221*a*.

The dumpling skin folding parts SF and GF may be rotatably coupled to the upper plate part 221. As illustrated in FIGS. 4 to 8, the dumpling skin folding parts SF and GF may include the support finger SF that primarily presses the dumpling skin and the gathering finger GF that secondarily presses the dumpling skin pressed by the support finger SF and gathers an edge area of the dumpling skin.

In an embodiment, two support fingers SF may be provided and arranged to face each other. The support finger SF may press the dumpling skin in a direction perpendicular to a transfer direction of the dumpling skin pressing unit 220 transferred by the folding moving unit 240.

As illustrated in FIGS. 4 to 7, the support finger SF may be rotated by a preset rotation angle for a first support finger before the gathering finger GF, may press a lower surface of the dumpling skin seated on the dumpling skin seated area "K", may slightly lifts both sides of the dumpling skin, and then may be stopped without the rotation.

As illustrated in FIGS. 4 to 7, the support finger SF according to the present embodiment may include a support body SF1 rotatably coupled to the upper plate part 221 and a support flange SF2 that protrudes from a side wall of the support body SF1 and is in contact with the dumpling skin.

A support rotation center shaft SF3 rotatably coupled to the upper plate part 221 may be formed in the support body SF1.

As illustrated in FIGS. 4 to 7, the support flange SF2 is formed long in a horizontal direction, so that a contact area with the folded dumpling skin may increase, and the dumpling skin may be more strongly pressed.

The gathering finger GF may secondarily press the dumpling skin pressed by the support finger SF. In the present embodiment, as illustrated in FIGS. 4 to 7, four gathering fingers GF are provided and may be radially spaced apart from each other with respect to a center of the dumpling skin seated area "K".

A gathering rotation center shaft GF3 rotatably coupled to the upper plate part 221 may be formed in the gathering finger GF.

After the support finger SF starts to rotate or after the support finger SF is rotated by the rotation angle for the first support finger, the gathering finger GF may be rotated by a preset rotation angle for a gathering finger (see FIG. 7C).

After the gathering finger GF starts to rotate or after the gathering finger GF is rotated by the rotation angle for the gathering finger, the support finger SF may be rotated by a preset rotation angle for a second support finger (see FIG. 7D). Here, the rotation angle for the second support finger may be greater than the rotation angle for the first support finger.

After the support finger SF is rotated by the rotation angle for the first support finger, the gathering finger GF is rotated by the rotation angle for the gathering finger, and then the support finger SF is rotated by the rotation angle for the second support finger. Thus, an edge area of the dumpling skin may be gathered in a center, and the dumpling skin may be folded. The dumpling skin is primarily pressed by the support finger SF, is secondarily pressed by the gathering finger GF, and is then finally pressed by the support finger SF, and thus the dumpling skin may be accurately folded while the dumpling filling does not escape from the dumpling skin.

The folding rotation driving module 222 may be connected to the upper plate part 221. The folding rotation driving module 222 may rotate the dumpling skin folding parts SF and GF.

As illustrated in FIGS. 4 to 7, the folding rotation driving module 222 according to the present embodiment may include an intermediate plate part 223 disposed in a lower area of the upper plate part 221 and connected to the upper plate part 221 to be a relatively movable, a gathering finger link part 224 hinge-coupled to the intermediate plate part 223 and hinge-coupled to the gathering finger GF, an intermediate plate moving part 225 that is connected to the intermediate plate part 223 and moves the intermediate plate part 223 in a direction of the upper plate part 221, a lower plate part 226 disposed in a lower area of the intermediate plate part 223, connected to the upper plate part 221 to be relatively movable, and having a through body "N" passing through the intermediate plate part 223, a support finger link part 227 hinge-coupled to the through body "N" and hinged coupled to the support finger SF, and a lower plate moving part 228 that is connected to the lower plate part 226 and moves the lower plate part 226 in the direction of the upper plate part 221.

The intermediate plate part 223 may be disposed in a lower area of the lower plate part 226. The intermediate plate part 223 may be coupled to an intermediate plate guide shaft R1 coupled to the upper plate part 221 to be slidably movable in a vertical direction and thus may move relative to the upper plate part 221 in the vertical direction.

The gathering finger link part 224 may be formed in a bar shape. One end area of the gathering finger link part 224 may be rotatably coupled to the intermediate plate part 223. Further, the other end area of the gathering finger link part 224 may be rotatably coupled to the gathering finger GF.

The intermediate plate moving part 225 may be connected to the intermediate plate part 223 to move the intermediate plate part 223 in the direction of the upper plate part 221. As illustrated in FIGS. 4 to 7, the intermediate plate moving part 225 according to the present embodiment may include a gathering finger elevating body 225*a* that passes through the lower plate part 226 and is coupled to the intermediate plate part 223 and a gathering finger rotating roller 225*b* that is rotatably coupled to the gathering finger elevating body 225*a* and is connected to the folding cam rail unit 230.

The gathering finger rotating roller 225*b* may be connected to an upper surface of a gathering finger support rail part 232 of the folding cam rail unit 230 and move along the upper surface of the gathering finger support rail part 232. In this case, the gathering finger rotating roller 225*b* may move upward according to a shape of the upper surface of the gathering finger support rail part 232, and the upward movement of the gathering finger rotating roller 225*b* may allow the gathering finger elevating body 225*a* to move upward.

The upward movement of the gathering finger elevating body 225*a* may allow the intermediate plate part 223 to be raised in the direction of the upper plate part 221, and the raising of the intermediate plate part 223 may allow the gathering finger link part 224 to be raised, allow the gathering finger GF to be rotated, and allow the gathering finger GF to be raised.

The lower plate part 226 may be disposed in the lower area of the intermediate plate part 223. The lower plate part 226 may be coupled to a lower plate guide shaft R2 coupled to the upper plate part 221 to be slidably movable in the vertical direction and thus may move relative to the upper plate part 221 in the vertical direction.

The through body "N" that is connected to the upper plate part 221 to be relatively movable and passes through the intermediate plate part 223 may be provided in the lower plate part 226. A cut hole (not illustrated), through which the through body "N" passes, may be formed in the intermediate plate part 223.

The support finger link part 227 may be formed in a bar shape. One end area of the support finger link part 227 may be rotatably coupled to the through body "N". Further, the other end area of the support finger link part 227 may be rotatably coupled to the support finger SF.

The lower plate moving part 228 may be connected to the lower plate part 226 to move the lower plate part 226 in the direction of the upper plate part 221.

As illustrated in FIGS. 4 to 7, the lower plate moving part 228 according to the present embodiment may include a support finger elevating body **228*a* that is coupled to the lower plate part 226 and a support finger rotating roller 228*b* that is rotatably coupled to the support finger elevating body 228*a* and is connected to the folding cam rail unit 230**.

The support finger rotating roller **228*b* may be connected to an upper surface of a support finger support rail part 231 of the folding cam rail unit 230 and move along the upper surface of the support finger support rail part 231. In this case, the support finger rotating roller 228*b* may move upward according to a shape of the upper surface of the support finger support rail part 231, and the upward movement of the support finger rotating roller 228*b* may allow the support finger elevating body 228*a*** to move upward.

The upward movement of the support finger elevating body **228*a* may allow the lower plate part 226 to be raised in the direction of the upper plate part 221, the raising of the lower plate part 226 may allow the through body "N" to be raised and allow the support finger link part 227 to be raised, and the raised support finger link part 227** may rotate the support finger SF to raise the support finger SF.

The upper plate support part 229 may be connected to the folding cam rail unit 230 to support the upper plate part 221.

As illustrated in FIGS. 4 to 7, the upper plate support part 229 may include an upper plate support body **229*a* that is coupled to the upper plate part 221 and an upper plate rotating roller 229*b* that is rotatably coupled to the upper plate support body 229*a* and connected to the folding cam rail unit 230**.

The upper plate rotating roller **229*b* may be connected to an upper surface of an upper plate support rail part 233 of the folding cam rail unit 230 and move along the upper surface of the upper plate support rail part 233. Unlike the upper surfaces of the support finger support rail part 231 and the gathering finger support rail part 232, the upper surface of the upper plate support rail part 233 may be formed in a flat shape with no inclination and thus prevent sagging of the upper plate part 221** during a moving process.

The folding cam rail unit 230 may be coupled to the folding device frame 210. The folding cam rail unit 230 may be disposed adjacent to the dumpling skin pressing unit 220 and connected to the dumpling skin pressing unit to move (rotate) the dumpling skin folding parts SF and GF while the dumpling skin pressing unit 220 moves in a direction from the dumpling skin cutting device 100 to the sealing device 300.

As illustrated in FIGS. 1, 8, and 9, the folding cam rail unit 230 according to the present embodiment may include the support finger support rail part 231 in which the support finger rotating roller **228*b* moves along an upper surface thereof, the gathering finger support rail part 232 which is spaced apart from the support finger support rail part 231 and in which the gathering finger rotating roller 225*b* moves along an upper surface thereof, and the upper plate support rail part 233 which is spaced apart from the support finger support rail part 231 and the gathering finger support rail part 232 and in which the upper plate rotating roller 229*b*** moves along an upper surface thereof.

The support finger support rail part 231 may be formed in a long bar shape. The support finger rotating roller **228*b* may move along the upper surface of the support finger support rail part 231**.

The gathering finger support rail part 232 may be spaced apart from the support finger support rail part 231. The gathering finger rotating roller **225*b* may move along the upper surface of the gathering finger support rail part 232**.

As illustrated in FIG. 9, an upper surface of a front side of the support finger support rail part 231 may be inclined in front of a front side of the gathering finger support rail part 232 so that the support finger rotating roller **228*b* may be raised before the gathering finger rotating roller 225*b***.

The gathering finger rotating roller **225*b* and the support finger rotating roller 228*b* may move upward according to heights of portions of upper ends of the gathering finger support rail part 232 and the support finger support rail part 231, and the support finger SF and the gathering finger GF may be rotated and raised according to the upward movement of the gathering finger rotating roller 225*b* and the support finger rotating roller 228*b***.

The folding moving unit 240 may be connected to the dumpling skin pressing unit 220. The folding moving unit 240 may move the dumpling skin pressing unit 220 relative to the folding cam rail unit 230.

As illustrated in FIGS. 1 and 2, the folding moving unit 240 according to the present embodiment may include the folding chain part 241 coupled to the dumpling skin pressing unit 220, a folding pulley part 242 connected to the folding chain part 241, and a folding driving motor 243 that is connected to the folding pulley part 242 and rotates the folding pulley part 242.

The folding chain part 241 may be coupled to an upper plate of the dumpling skin pressing unit 220. In the present embodiment, a pair of folding chain parts 241 may be provided and may be coupled to both end areas of the upper plate, respectively.

The folding pulley part 242 may be rotatably coupled to the folding device frame 210. The folding pulley part 242 may be connected to the folding chain part 241.

The folding driving motor 243 may be supported by the folding device frame 210. The folding driving motor 243 may be connected to the folding pulley part 242 to rotate the folding pulley part 242.

Meanwhile, the sealing device 300 may be disposed in an upper region of the dumpling forming lower folding device 200. The sealing device 300 may press and seal the dumpling skin folded by the dumpling forming lower folding device 200.

As illustrated in FIGS. 1, 2, and 10 to 14, the sealing device 300 according to the present embodiment may include a sealing device frame 310 supported by the folding device frame 210, a sealing pressing unit 320 including a first sealing pad P1 that presses the dumpling skin folded by the dumpling forming lower folding device 200 and a second sealing pad P2 that is disposed opposite to the first sealing pad P1 to press the dumpling skin in a direction of the first sealing pad P1, a sealing cam rail unit 330 that is disposed adjacent to the sealing pressing unit 320, is connected to the sealing pressing unit 320, and moves the first sealing pad P1 and the second sealing pad P2, and a sealing moving unit 340 that is connected to the sealing pressing unit 320 and moves the sealing pressing unit 320 relative to the sealing cam rail unit 330.

As illustrated in FIGS. 1 and 2, a plurality of sealing pressing units 320 may be provided and arranged in a caterpillar form. The plurality of sealing pressing units 320 may be coupled to a sealing chain part 341, which will be described below, of the sealing moving unit 340, may continuously rotate according to rotation of the sealing chain part 341, and may move in a direction from the dumpling skin cutting device to the sealing device 300.

As illustrated in FIGS. 1, 2, and 10 to 14, the sealing pressing unit 320 according to the present embodiment may include a sealing support plate part 321 connected to the first sealing pad P1 that presses the dumpling skin folded by the dumpling forming lower folding device 200, the second sealing pad P2 that is disposed opposite to the first sealing pad P1 to press the dumpling skin in a direction of the first sealing pad P1, and connected to the sealing moving unit 340, a first moving plate part 322 which is coupled to the sealing support plate part 321 to be relatively movable and to which the first sealing pad P1 is coupled, a first moving plate moving part 323 that is coupled to the first moving plate part 322, is connected to the sealing cam rail unit 330, and moves the first moving plate part 322, a second moving plate part 324 which is coupled to the sealing support plate part 321 to be relatively movable and to which the second sealing pad P2 is coupled, a second moving plate moving part 325 that is coupled to the second moving plate part 324, is connected to the sealing cam rail unit 330, and moves the second moving plate part 324, a first original position returning part 326 that is coupled to the sealing support plate part 321, is connected to the first moving plate part 322, and returns the first moving plate part 322 moved by the first moving plate moving part 323 to an original position thereof, and a second original position returning part 327 that is coupled to the sealing support plate part 321, is connected to the second moving plate part 324, and returns the second moving plate part 324 moved by the second moving plate moving part 325 to an original position thereof.

The first sealing pad P1 and the second sealing pad P2 may be arranged to face each other. A plurality of first sealing pads P1 and a plurality of second sealing pads P2 may be provided and spaced apart from each other. The dumpling having the dumpling skin folded by the dumpling forming lower folding device 200 may be disposed between the first sealing pad P1 and the second sealing pad P2. The first sealing pad P1 and the second sealing pad P2 may approach each other to press the dumpling disposed therebetween so as to finally seal the dumpling skin.

The sealing support plate part 321 may be formed in a long plate shape. Both end areas of the sealing support plate part 321 may be connected to the folding chain part 241, which will be described below, of the sealing moving unit 340.

A first guide rail 321*a* and a second guide rail 321*b* to which the first moving plate part 322 and the second moving plate part 324 are slidably coupled may be arranged on a lower surface of the sealing support plate part 321 according to the present embodiment to be spaced apart from each other.

Further, a first through-hole 321*c*, through which a first moving plate protrusion block 326*b*, which will be described below, passes, and a second through-hole 321*d*, through which a second moving plate protrusion block 327*b*, which will be described below, passes, may be formed in the sealing support plate part 321.

The first moving plate part 322 may be slidably coupled to the first guide rail 321*a* of the sealing support plate part 321 and move relative to the sealing support plate part 321. The plurality of first sealing pads P1 may be coupled to the first moving plate part 322, and the plurality of first sealing pads P1 may be spaced apart from each other.

The first moving plate moving part 323 may be coupled to the first moving plate part 322. The first moving plate moving part 323 may be connected to a first sealing support rail part 331, which will be described below, of the sealing cam rail unit 330 and move the first moving plate part 322.

As illustrated in FIG. 11, the first moving plate moving part 323 according to the present embodiment may include a first rotation center shaft 323*a* coupled to the first moving plate part 322 and a first rotating roller 323*b* rotatably coupled to the first rotation center shaft 323*a*.

The first rotating roller 323*b* may be connected to a side surface of the first sealing support rail part 331 of the sealing cam rail unit 330 and move along the side surface of the first sealing support rail part 331. In this case, the first rotating roller 323*b* may move in a horizontal direction (a leftward direction of FIGS. 10 and 11) according to a shape of the side surface of the first sealing support rail part 331, and the leftward movement of the first rotating roller 323*b* may allow the first moving plate part 322 to move leftward.

When the first moving plate part 322 moves leftward, the first sealing pad P1 coupled to the first moving plate part 322 may also move leftward.

The second moving plate part 324 may be slidably coupled to the second guide rail 321*b* of the sealing support plate part 321 and move relative to the sealing support plate part 321. The plurality of second sealing pads P2 may be coupled to the second moving plate part 324, and the plurality of second sealing pads P2 may be spaced apart from each other.

The second moving plate moving part 325 may be coupled to the second moving plate part 324. The second moving plate moving part 325 may be connected to a second sealing support rail part 332, which will be described below, of the sealing cam rail unit 330 and move the second moving plate part 324.

As illustrated in FIG. 11, the second moving plate moving part 325 according to the present embodiment may include a second rotation center shaft 325*a* coupled to the second moving plate part 324 and a second rotating roller 325*b* rotatably coupled to the second rotation center shaft 325*a*.

The second rotating roller 325*b* may be connected to a side surface of the second sealing support rail part 332 of the sealing cam rail unit 330 and move along the side surface of the second sealing support rail part 332. In this case, the second rotating roller 325*b* may move in a horizontal direction (a rightward direction of FIGS. 10 and 11) according to a shape of the side surface of the second sealing support rail part 332, and the rightward movement of the second rotating roller 325*b* may allow the second moving plate part 324 to move rightward.

When the second moving plate part 324 moves rightward, the second sealing pad P2 coupled to the second moving plate part 324 may also move rightward.

The first original position returning part 326 may be coupled to the sealing support plate part 321. The first original position returning part 326 may be connected to the first moving plate part 322 and may return the first moving plate part 322 moved by the first moving plate moving part 323 to an original position thereof.

As illustrated in FIGS. 10 and 11, the first original position returning part 326 according to the present embodiment may include a first returning fixing block 326*a* coupled to the sealing support plate part 321, the first moving plate protrusion block 326*b* that is coupled to the first moving plate part 322 and passes through the first through-hole 321*c* formed in the sealing support plate part 321, and a first returning elastic body 326*c* that is coupled to the first returning fixing block 326*a*, is connected to the first moving plate protrusion block 326*b*, and elastically presses the first moving plate protrusion block 326*b*.

The first returning fixing block 326*a* may be coupled to an upper surface of the sealing support plate part 321. The first moving plate protrusion block 326*b* may be coupled to an upper surface of the first moving plate part 322. The first moving plate protrusion block 326*b* may pass through the first through-hole 321*c* of the sealing support plate part 321 and may be disposed to face the first returning fixing block 326*a*.

One end of the first returning elastic body 326*c* may be coupled to the first returning fixing block 326*a*, and the other end thereof may be coupled to the first moving plate protrusion block 326*b*. The first returning elastic body 326*c* may provide an elastic force to the first moving plate part 322 moved by the first moving plate moving part 323 to return the first moving plate part 322 to an original position thereof.

The second original position returning part 327 may be coupled to the sealing support plate part 321. The second original position returning part 327 may be connected to the second moving plate part 324 and may return the second moving plate part 324 moved by the second moving plate moving part 325 to an original position thereof.

As illustrated in FIGS. 10 and 11, the second original position returning part 327 according to the present embodiment may include a second returning fixing block 327*a* coupled to the sealing support plate part 321, the second moving plate protrusion block 327*b* that is coupled to the second moving plate part 324 and passes through the second through-hole 321*d* formed in the sealing support plate part 321, and a second returning elastic body 327*c* that is coupled to the second returning fixing block 327*a*, is connected to the second moving plate protrusion block 327*b*, and elastically presses the second moving plate protrusion block 327*b*.

The second returning fixing block 327*a* may be coupled to the upper surface of the sealing support plate part 321. The second moving plate protrusion block 327*b* may be coupled to an upper surface of the second moving plate part 324. The second moving plate protrusion block 327*b* may pass through the second through-hole 321*d* of the sealing support plate part 321 and may be disposed to face the second returning fixing block 327*a*.

One end of the second returning elastic body 327*c* may be coupled to the second returning fixing block 327*a*, and the other end thereof may be coupled to the second moving plate protrusion block 327*b*. The second returning elastic body 327*c* may provide an elastic force to the second moving plate part 324 moved by the second moving plate moving part 325 to return the second moving plate part 324 to an original position thereof.

The sealing cam rail unit 330 may be coupled to the sealing device frame 310. The sealing cam rail unit 330 may be disposed adjacent to the sealing pressing unit 320, may be connected to the sealing pressing unit 320 while the sealing pressing unit 320 moves, and may move the first sealing pad P1 and the second sealing pad P2 in a direction in which the first sealing pad P1 and the second sealing pad P2 approach each other.

As illustrated in FIGS. 2 and 14, the sealing cam rail unit 330 according to the present embodiment may include the first sealing support rail part 331, in which the first rotating roller 323*b* moves along a side surface thereof, and the second sealing support rail part 332, in which the second rotating roller 325*b* moves along a side surface thereof.

As illustrated in FIG. 14, the side surface of the first sealing support rail part 331 is inclined, and thus the first rotating roller 323*b* in contact with the inclined side surface of the first sealing support rail part 331 may move leftward in FIG. 14. The leftward movement of the first rotating roller 323*b* may allow the first moving plate part 322 to move in a leftward direction. When the first moving plate part 322 moves leftward, the first sealing pad P1 coupled to the first moving plate part 322 may also move leftward.

As illustrated in FIG. 14, the side surface of the second sealing support rail part 332 is inclined, and thus the second rotating roller 325*b* in contact with the inclined side surface of the second sealing support rail part 332 may move rightward in FIG. 14. The rightward movement of the second rotating roller 325*b* may allow the second moving plate part 324 to move in a rightward direction. When the second moving plate part 324 moves rightward, the second sealing pad P2 coupled to the second moving plate part 324 may also move rightward.

The sealing moving unit 340 may be connected to the sealing pressing unit 320. The sealing moving unit 340 may move the sealing pressing unit 320 relative to the sealing cam rail unit 330.

As illustrated in FIGS. 1 and 2, the sealing moving unit 340 according to the present embodiment may include the sealing chain part 341 coupled to the sealing pressing unit 320, a sealing pulley part 342 connected to the sealing chain part 341, and a sealing driving motor 343 that is connected to the sealing pulley part 342 and rotates the sealing pulley part 342.

The sealing chain part 341 may be coupled to the sealing support plate part 321 of the sealing pressing unit 320. In the present embodiment, a pair of sealing chain parts 341 may be provided and may be coupled to both end areas of the sealing support plate part 321, respectively.

The sealing pulley part 342 may be rotatably coupled to the sealing device frame 310. The sealing chain part 341 may be connected to the sealing pulley part 342.

The sealing driving motor 343 may be supported by the sealing device frame 310. The sealing driving motor 343 may be connected to the sealing pulley part 342 to rotate the sealing pulley part 342.

Hereinafter, the in-line dumpling forming system according to the present embodiment will be described with reference to FIGS. 1 to 14.

The dumpling skin cutting device 100 may press the noodle sheet for the dumpling skin with the dumpling skin pressing unit 220 of the dumpling forming lower folding device 200. The dumpling skin cut by the pressing of the dumpling skin cutting device 100 may be disposed in the dumpling skin seated area "K".

The dumpling skin pressing unit 220 moves by the folding moving unit 240 so that the support finger rotating roller 228*b* and the gathering finger rotating roller 225*b* may come into contact with the upper surfaces of the support finger support rail part 231 and the gathering finger support rail part 232 of the folding cam rail unit 230.

The support finger rotating roller 228*b* and the gathering finger rotating roller 225*b* are raised according to shapes of the upper surfaces of the support finger support rail part 231 and the gathering finger support rail part 232 of the folding cam rail unit 230, and thus the support finger SF and the gathering finger GF may be rotated and raised as illustrated in FIG. 7.

In this case, as illustrated in FIG. 7B, the two support fingers SF may be rotated before the gathering finger GF to press a lower surface of the dumpling skin seated on the dumpling skin seated area "K" so as to slightly lift both sides of the dumpling skin.

Thereafter, as illustrated in FIG. 7C, the four gathering fingers GF may be rotated to secondarily press the dumpling skin pressed by the support fingers SF.

Next, as illustrated in FIG. 7D, the two support fingers SF may be rotated at a larger angle for the second support finger having an angle greater than the rotation angle for the first support finger to strongly press the dumpling skin.

As described above, the dumpling skin may be folded by the raising of the support fingers SF and the gathering fingers GF, and the folded dumpling skin may continuously move to reach the sealing device 300.

The sealing device 300 may press, with the first sealing pad P1 and the second sealing pad P2, the dumpling having the dumpling skin folded by the dumpling forming lower folding device 200, may attach the dumpling skin to the dumpling, and thus may form the dumpling having a final shape.

In this way, the in-line dumpling forming system according to the present embodiment may include the dumpling skin cutting device 100 that forms the dumpling skin by cutting the supplied noodle sheet for the dumpling skin, the dumpling forming lower folding device 200 that is disposed in a lower area of the dumpling skin cutting device 100 and presses and folds the dumpling skin to which the dumpling filling is supplied, and the sealing device 300 that is disposed in an upper area of the dumpling forming lower folding device 200 and presses and seals the folded dumpling skin. Thus, an installation area may be reduced by positioning the dumpling skin cutting device 100 and the sealing device 300 on the upper area of the dumpling forming lower folding device 200. Accordingly, productivity is high compared to the installation area, and the dumpling may be formed into an accurate shape, and thus occurrence of defects may be reduced.

Although the present embodiment has been described in detail with reference to the accompanying drawings, the scope of rights of the present embodiment is not limited to the above-described drawings and description.

In this way, the present disclosure is not limited to the described embodiments, and it is obvious to those skilled in the art that various changes and modifications may be made without departing from the spirit and scope of the present disclosure. Thus, the changes or modifications should belong to the appended claims of the present disclosure.

INDUSTRIAL APPLICABILITY

The present invention can be used in the processing industry, especially in the food processing industry.

The invention claimed is:

1. An in-line dumpling forming system comprising:

a dumpling skin cutting device configured to cut a noodle sheet to form a dumpling skin;

a dumpling forming lower folding device which is disposed in a lower area of the dumpling skin cutting device, on which the cut dumpling skin is seated, and which presses and folds the dumpling skin to which dumpling filling has been supplied; and a sealing device disposed on an upper area of the dumpling forming lower folding device and configured to press and seal the folded dumpling skin.

2. The in-line dumpling forming system of claim 1, wherein the dumpling skin cutting device includes:

a cutting device frame;

a first noodle sheet presser supported by the cutting device frame and configured to primarily press the noodle sheet with a protrusion cutter formed in the dumpling forming lower folding device; and a second noodle sheet presser supported by the cutting device frame, spaced apart from the first noodle sheet presser, and configured to secondarily press, with the protrusion cutter, the noodle sheet primarily pressed by the first noodle sheet presser.

3. The in-line dumpling forming system of claim 2, wherein the first noodle sheet presser includes:

a first rotational bar part rotatably coupled to the cutting device frame;

a first pressing roller part rotatably coupled to the first rotational bar part and configured to press the noodle sheet; and a first height adjusting part supported by the cutting device frame, connected to the first rotational bar part, and configured to adjust a height of the first pressing roller part with respect to the protrusion cutter by adjusting a rotational angle of the first rotational bar part.

4. The in-line dumpling forming system of claim 2, wherein the second noodle sheet presser includes:

a second rotational bar part rotatably coupled to the cutting device frame;

a second pressing roller part rotatably coupled to the second rotational bar part and configured to press the noodle sheet; and a second height adjusting part supported by the cutting device frame, connected to the second rotational bar part, and configured to adjust a height of the second pressing roller part with respect to the protrusion cutter by adjusting a rotational angle of the second rotational bar part.

5. The in-line dumpling forming system of claim 1, wherein the sealing device includes:

a sealing pressing unit including a first sealing pad configured to press the dumpling skin folded by the dumpling forming lower folding device and a second sealing pad spaced apart from the first sealing pad and configured to press the dumpling skin in a direction of the first sealing pad;

a sealing cam rail unit connected to the sealing pressing unit and configured to move the first sealing pad and the second sealing pad; and a sealing moving unit connected to the sealing pressing unit and configured to move the sealing pressing unit relative to the sealing cam rail unit.

6. The in-line dumpling forming system of claim 5, wherein a plurality of the sealing pressing units are provided, and the plurality of sealing pressing units are arranged in a caterpillar form.

7. The in-line dumpling forming system of claim 5, wherein the sealing pressing unit includes:

a sealing support plate part connected to the sealing moving unit;

a first moving plate part which is coupled to the sealing support plate part to be relatively movable and to which the first sealing pad is coupled;

a first moving plate moving part coupled to the first moving plate part, connected to the sealing cam rail unit, and configured to move the first moving plate part;

a second moving plate part which is coupled to the sealing support plate part to be relatively movable and to which the second sealing pad is coupled;

a second moving plate moving part coupled to the second moving plate part, connected to the sealing cam rail unit, and configured to move the second moving plate part;

a first original position returning part coupled to the sealing support plate part, connected to the first moving plate part, and configured to return the first moving plate part moved by the first moving plate moving part to an original position thereof, and a second original position returning part coupled to the sealing support plate part, connected to the second moving plate part, and configured to return the second moving plate part moved by the second moving plate moving part to an original position thereof.

8. The in-line dumpling forming system of claim 7, wherein the first moving plate moving part includes:

a first rotation center shaft coupled to the first moving plate part; and a first rotating roller rotatably coupled to the first rotation center shaft.

9. The in-line dumpling forming system of claim 8, wherein the second moving plate moving part includes:

a second rotation center shaft coupled to the second moving plate part; and a second rotating roller rotatably coupled to the second rotation center shaft.

10. The in-line dumpling forming system of claim 7, wherein the first original position returning part includes:

a first returning fixing block coupled to the sealing support plate part;

a first moving plate protrusion block coupled to the first moving plate part and passing through a first through-hole formed in the sealing support plate part; and a first returning elastic body coupled to the first returning fixing block, connected to the first moving plate protrusion block, and configured to press the first moving plate protrusion block.

11. The in-line dumpling forming system of claim 7, wherein the second original position returning part includes:

a second returning fixing block coupled to the sealing support plate part;

a second moving plate protrusion block coupled to the second moving plate part and passing through a second through-hole formed in the sealing support plate part; and a second returning elastic body coupled to the second returning fixing block, connected to the second moving plate protrusion block, and configured to press the second moving plate protrusion block.

12. The in-line dumpling forming system of claim 9, wherein the sealing cam rail unit includes:

a first sealing support rail part in which the first rotating roller moves along a side surface thereof, and a second sealing support rail part in which the second rotating roller moves along a side surface thereof.

* * * * *